United States Patent
Konno

(10) Patent No.: US 7,663,472 B2
(45) Date of Patent: Feb. 16, 2010

(54) ELECTRONIC KEY SYSTEM FOR MOTORCYCLE

(75) Inventor: Takeshi Konno, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/677,075

(22) Filed: Sep. 30, 2003

(65) Prior Publication Data

US 2004/0063477 A1    Apr. 1, 2004

(30) Foreign Application Priority Data

Sep. 30, 2002    (JP)    ............... 2002-284742
Sep. 30, 2002    (JP)    ............... 2002-284743

(51) Int. Cl.
*G05B 19/00*    (2006.01)
*G06F 7/00*    (2006.01)
*G08B 29/00*    (2006.01)
*H04B 1/00*    (2006.01)
*H04Q 1/00*    (2006.01)

(52) U.S. Cl. ............ 340/5.61; 340/5.6; 340/5.7; 340/10.1; 340/10.3; 340/10.4; 343/713; 343/711

(58) Field of Classification Search ............ 340/5.61, 340/5.6, 5.7, 10.1, 10.3, 10.4, 426, 5.32, 340/5.33, 825.36, 825.49, 426.11; 381/86; 343/713, 711
See application file for complete search history.

(56) References Cited

U.S. PATENT DOCUMENTS

| | | | | |
|---|---|---|---|---|
| 3,816,837 A | * | 6/1974 | Smith | ............... 343/713 |
| 3,896,448 A | * | 7/1975 | Killen et al. | ............... 343/713 |
| 4,132,994 A | * | 1/1979 | Caldwell | ............... 343/713 |
| 4,897,644 A | * | 1/1990 | Hirano | ............... 340/5.62 |
| 5,124,565 A | | 6/1992 | Yoshida et al. | |
| 5,134,392 A | * | 7/1992 | Takeuchi et al. | ............... 340/5.62 |
| 5,293,160 A | * | 3/1994 | Kurozu et al. | ............... 340/5.3 |

(Continued)

FOREIGN PATENT DOCUMENTS

EP    1232920 A2    8/2002

(Continued)

OTHER PUBLICATIONS

Search Report, Spanish Patent Application No. P200302200, dated Oct. 1, 2006.

(Continued)

*Primary Examiner*—Brian A Zimmerman
*Assistant Examiner*—Nam V Nguyen
(74) *Attorney, Agent, or Firm*—Lahive & Cockfield, LLP; Anthony A. Laurentano

(57) ABSTRACT

In an electronic key system for a vehicle which includes a control apparatus mounted on an actual vehicle and an electronic key for transmitting a response signal in response to receiving of a request signal transmitted from the control apparatus through a transmitting antenna, the transmitting antenna is installed on an instrument panel of the actual vehicle. In particular, the instrument panel has various instruments (a speedometer, a direction indicator (left), another direction indicator (right), and so forth) and a board for securing the instruments thereto. Accordingly, the transmitting antenna is installed at a position on the board rather near to a seat (a position of front side of the user when the user is seated on the seat).

7 Claims, 15 Drawing Sheets

U.S. PATENT DOCUMENTS

| | | | | |
|---|---|---|---|---|
| 5,379,033 | A * | 1/1995 | Fujii et al. | 340/5.64 |
| 5,499,022 | A * | 3/1996 | Boschini | 340/5.62 |
| 5,552,641 | A * | 9/1996 | Fischer et al. | 307/10.5 |
| 5,723,911 | A * | 3/1998 | Glehr | 340/10.5 |
| 5,838,227 | A * | 11/1998 | Murray | 340/539.21 |
| 5,973,611 | A * | 10/1999 | Kulha et al. | 340/5.62 |
| 6,075,454 | A * | 6/2000 | Yamasaki | 340/5.61 |
| 6,078,293 | A * | 6/2000 | Yamamoto | 343/713 |
| 6,208,305 | B1 * | 3/2001 | King | 343/713 |
| 6,353,415 | B1 * | 3/2002 | Ashtiani et al. | 343/713 |
| 6,483,467 | B2 * | 11/2002 | Kushida et al. | 343/713 |
| 6,515,580 | B1 * | 2/2003 | Isoda et al. | 340/425.5 |
| 6,705,659 | B2 | 3/2004 | Suzuki et al. | |
| 6,710,700 | B1 * | 3/2004 | Tatsukawa et al. | 340/5.53 |

FOREIGN PATENT DOCUMENTS

| | | |
|---|---|---|
| EP | 1262925 A2 | 12/2002 |
| FR | 2751293 A1 | 1/1998 |
| JP | 58-133978 | 8/1983 |
| JP | 3-21575 | 1/1991 |
| JP | 4-146877 | 5/1992 |
| JP | 10-001079 | 1/1998 |
| JP | 10-278865 | 10/1998 |
| JP | 10317754 A | 12/1998 |
| JP | 2000-45588 | 2/2000 |
| JP | 2001-260709 | 9/2001 |
| JP | 2001-281001 | 10/2001 |
| JP | 2001349110 A | 12/2001 |
| JP | 2001349117 A | 12/2001 |
| JP | 2003-127833 | 5/2003 |
| WO | WO-02/29734 A1 | 4/2002 |

OTHER PUBLICATIONS

Japanese Office Action for Application No. 2002-284742, dated Jul. 31, 2007.

Japanese Office Action for Application No. 2002-284743, dated Jul. 31, 2007.

* cited by examiner

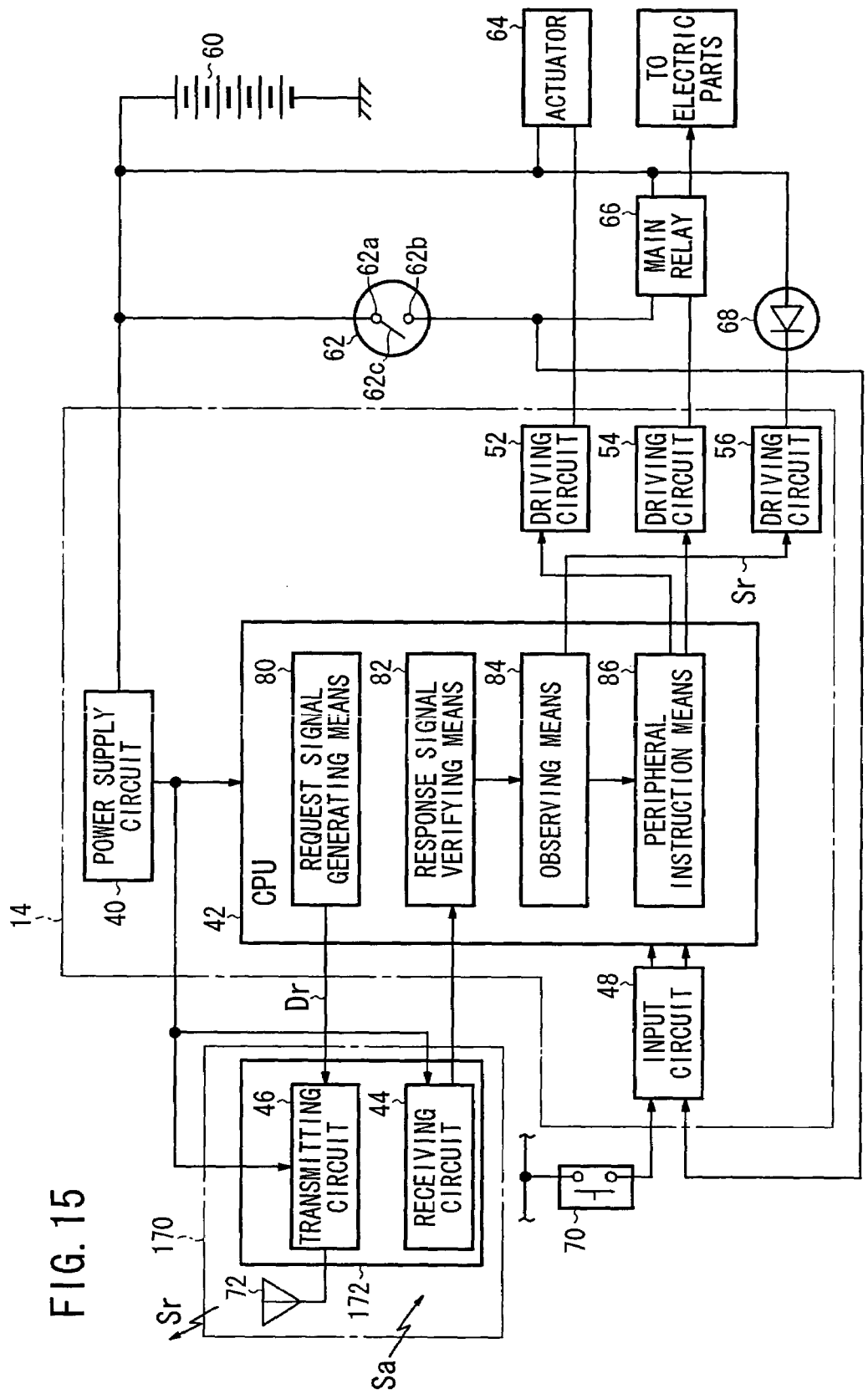

ELECTRONIC KEY SYSTEM FOR MOTORCYCLE

BACKGROUND OF THE INVENTION

1. Field of the Invention

This invention relates to an electronic key system for a vehicle wherein radio communication is performed between a tranceiver (electronic key) carried by a user and a control apparatus mounted on an actual vehicle to verify an ID and, if a request received originates from a legal user, then starting of an engine or some other action is performed, and more particularly to an electronic key system for a vehicle suitable for use with, for example, a motorcycle.

2. Description of the Related Art

An electronic key system for a vehicle is disclosed, for example, in Japanese laid-open patent publication No. 2001-349110 and Japanese laid-open patent publication No. 2001-349117. In the electronic key system for a vehicle disclosed in Japanese laid-open patent publication No. 2001-349110 and Japanese laid-open patent publication No. 2001-349117, starting means (switches) are provided on a door handle and a trunk lid of an actual vehicle. If a user operates (starts) any of the starting means, then communication of a control apparatus with an electronic key is started. Then, the control apparatus verifies an ID transmitted thereto from the electronic key with an ID registered therein. Thus, if a result of the verifying that the IDs are coincident with each other is obtained, then door locking and so forth are released.

Further, in Japanese laid-open patent publication No. 2001-349110 and Japanese laid-open patent publication No. 2001-349117 described above, a starting means (switch) is provided also on an ignition knob. If the user operates the ignition knob after the user gets on the four-wheeled car, then the communication between the electronic key and the starting means is performed again to perform ID verifying for permitting starting of the engine. Then, if a result of the verifying that the IDs are coincident with each other, the engine is started.

In particular, in the conventional vehicle electronic key system for a four-wheeled car, the electronic key has a function for unlocking a door and a function for permitting starting of an engine.

Further, as a different prior art apparatus, an electronic key system is proposed (refer to, for example, Japanese laid-open patent publication No. 10-317754) wherein transmitting antennas are provided individually for doors of a four-wheeled car, and only that one of the doors which is approached by a portable device can be unlocked independently of the other doors of the vehicle.

In this manner, in the electronic key system described above, the range of transmitting from the control apparatus mounted on an actual vehicle in the communication between the control apparatus and the electronic key is small in comparison with that from the electronic key. Therefore, in the prior art apparatus described above, a plurality of transmitting antennas for outputting a signal from the control apparatus are provided depending upon different applications.

Incidentally, in order to apply such an electronic key system to a motorcycle, at least when a user gets on and operates the actual vehicle and when the user is running with the actual vehicle, it is necessary for the user to communicate with certainty with the electronic key carried by the user.

For example, depending upon the user, the electronic key is sometimes carried in a pocket of clothing or the like. In such an instance, if the communication of the control apparatus with the electronic key is interrupted, then there is the possibility that a locking mechanism for a handle bar installed on the actual vehicle cannot be placed into an unlocking state and the user may not be permitted to ride on and run with the actual vehicle.

SUMMARY OF THE INVENTION

The present invention has been made in such a subject as described above, and it is an object of the present invention to provide an electronic key system for a vehicle wherein communication of the control apparatus with an electronic key carried by a user can be performed with certainty at least when the user gets on and operates the actual vehicle and when the user is running with the actual vehicle.

According to the present invention, an electronic key system for a vehicle which includes a control apparatus mounted on an actual vehicle and an electronic key for transmitting a response signal in response to receiving of a request signal transmitted from the control apparatus through a transmitting antenna is characterized in that the transmitting antenna is installed on an instrument panel of the actual vehicle or in the proximity of the instrument panel of the actual vehicle.

Normally, the user often performs, as an operation when the user gets on the actual vehicle, an operation at a position in the proximity of the instrument panel such as an operation of a switch disposed around a handle bar or confirmation of instruments.

According to the present invention, since the transmitting antenna is installed on the instrument panel of the actual vehicle or in the proximity of the instrument panel of the actual vehicle, a request signal transmitted from the control apparatus is outputted from the instrument panel or the proximity of the instrument panel of the actual vehicle. Therefore, as a transmitting range, most part of a range within which the user is present when the user performs an operation which may normally be performed when the user gets on the vehicle can be covered. As a result, at least when the user gets on and operates the actual vehicle and when the user is running with the actual vehicle, communication of the control apparatus with the electronic key carried by the user can be performed with certainty.

Further, since a wiring line between the control apparatus and the transmitting antenna and wiring lines for the various instruments can be gathered together, reduction of the space for the path of the wiring lines and reduction of a harness (connector) circuit can be achieved. Further, such merits as miniaturization, reduction of the weight, reduction of the cost of the electronic key system and hence of electric parts and so forth can be achieved.

Where the instrument panel has various instruments and a board for securing the instruments thereto, preferably the transmitting antenna is installed on the board. In this instance, when the user observes the instruments, the transmitting antenna does not make an obstacle at all, and besides there is a merit that the transmitting antenna can be mounted readily.

Preferably, the transmitting antenna is installed at a position on the board rather near to a seat. In this instance, when the user performs an operation while it rides on the actual vehicle, the transmitting antenna is present at a position nearest to the position at which the user is present. Consequently, communication of the control apparatus with the electronic key carried by the user can be performed with a higher degree of certainty.

Where a shade is mounted around the instrument panel, preferably the transmitting antenna is installed on the shade.

In this instance, where the shade is made of a resin, the transmitting antenna can be mounted simply at any portion of the shade.

Particularly, where the transmitting antenna is installed on an inner wall surface of the shade, when the user observes the instruments, the transmitting antenna does not make an obstacle at all, and besides there is a merit that the transmitting antenna can be mounted readily.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 15 is a block diagram showing a configuration of a control apparatus and the transmitting/receiving unit of the electronic key system according to the second modification.

DESCRIPTION OF THE PREFERRED EMBODIMENTS

In the following, an embodiment wherein an electronic key system for a vehicle according to the present invention is applied, for example, to a system of a motorcycle is described with reference to FIGS. 1 to 15.

Figure 1:
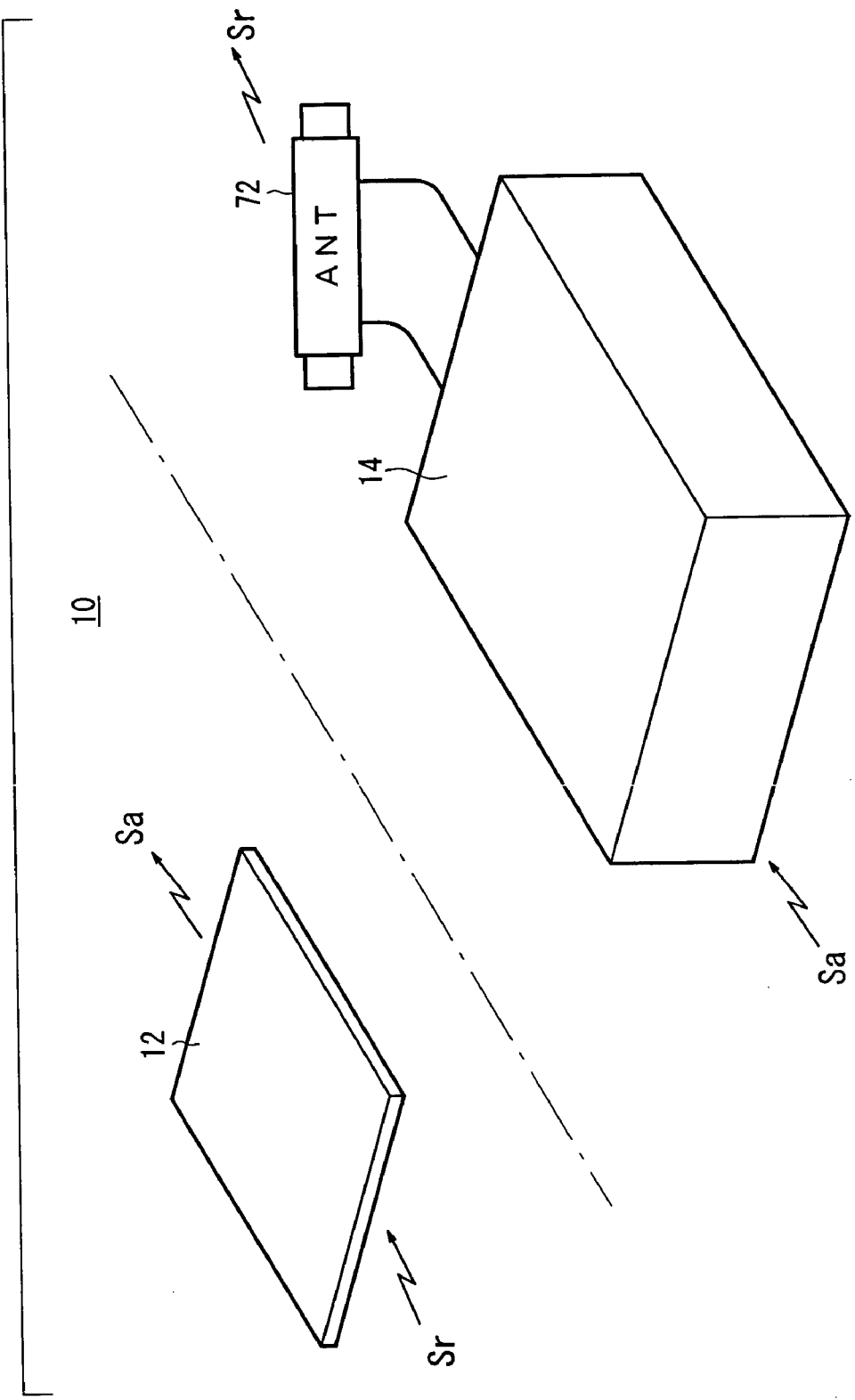
FIG. 1 is a schematic view showing an electronic key system according to an embodiment.
Figure 4:
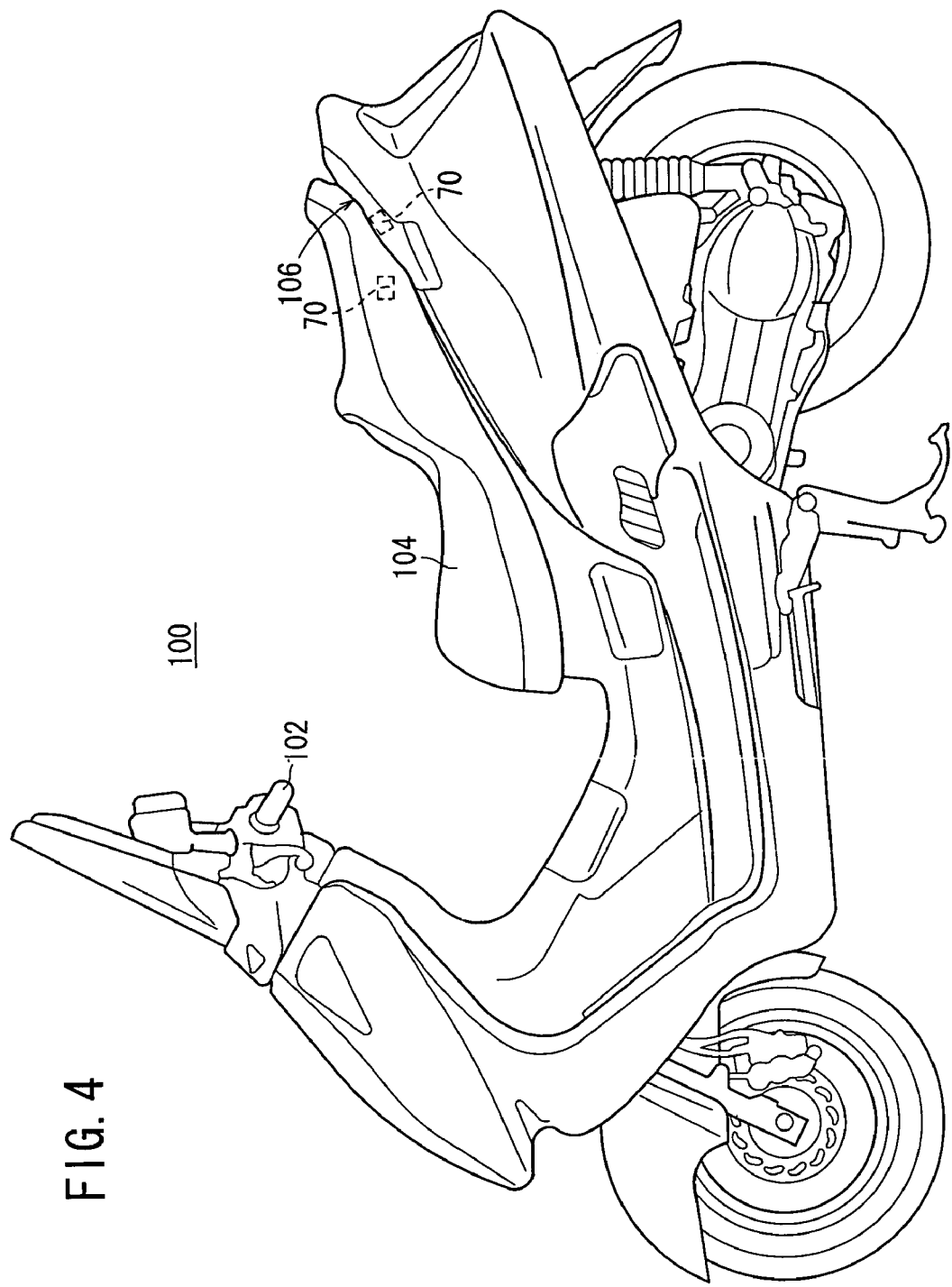
FIG. 4 is a schematic view showing an example wherein a starting switch is installed on a seat or in the proximity of the seat on an actual vehicle of the scooter type.

Referring to FIG. 1, an electronic key system 10 according to the present embodiment includes an electronic key 12 for being carried by a user and a control apparatus 14 mounted on an actual vehicle 100 (refer to FIG. 4). As the electronic key 12, a key which has a shape of a key as an outer shape thereof and incorporates an IC chip therein, another key which has a shape of a card as an outer shape thereof and incorporates an IC chip therein, and some other keys are available. Where the electronic key system according to the present invention is principally applied as a key-less system, a key having a shape of a card is used. In the present embodiment described below, it is assumed that the electronic key 12 has a shape of a card.

Figure 2:
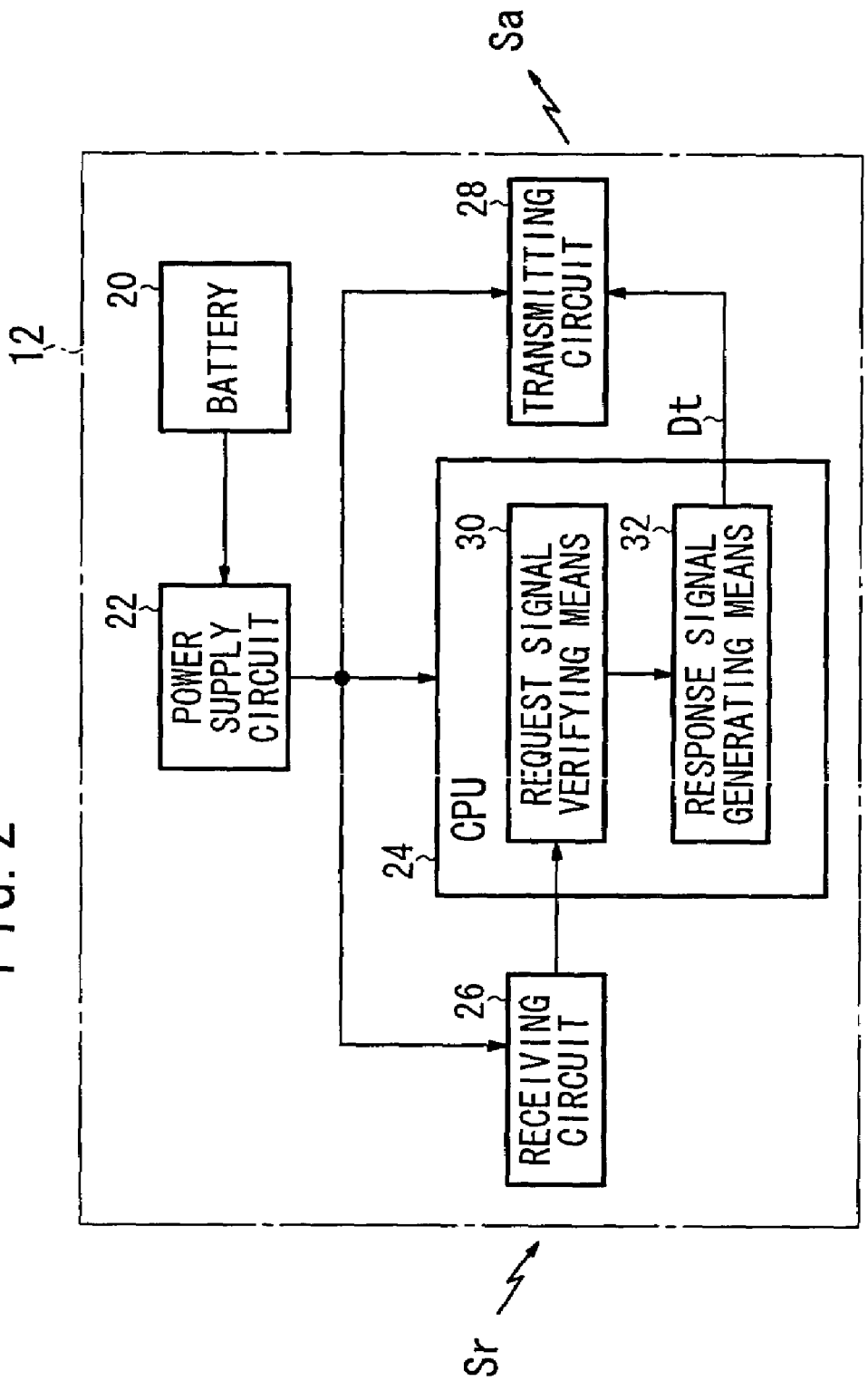
FIG. 2 is a block diagram showing a configuration of an electronic key.

Referring to FIG. 2, the electronic key 12 has a shape of a card as just described and includes a battery 20, a power supply circuit 22, a CPU 24, a receiving circuit 26 and a transmitting circuit 28 in the inside thereof.

The power supply circuit 22 supplies power supplied from the battery 20 to the receiving circuit 26, the transmitting circuit 28 and the CPU 24. The receiving circuit 26 includes a receiving antenna not shown. Further, the receiving circuit 26 receives a request signal Sr and so forth transmitted thereto from the control apparatus 14 through the receiving antenna and extracts the signal from a carrier wave to decode the signal. The decoded signal is supplied to the CPU 24. The frequency of the carrier wave of the request signal Sr ranges from 100 kHz to 300 kHz.

The CPU 24 executes at least two computer programs (a request signal verifying means 30 and a response signal generating means 32). The request signal verifying means 30 verifies whether or not a signal supplied from the receiving circuit 26 is the request signal Sr. Thus, if the signal supplied is the request signal Sr, the request signal verifying means 30 passes the control to the response signal generating means 32. The response signal generating means 32 reads out ID data recorded in a ROM not shown based on a request from the request signal verifying signal 30. Then, the response signal generating means 32 adds an attribute that indicates a response to the ID data and outputs the ID data as transmitting data Dt to the transmitting circuit 28. The transmitting circuit 28 includes a transmitting antenna not shown. The transmitting circuit 28 modulates a carrier wave in accordance with the transmitting data Dt supplied from the CPU 24 and transmits the modulated wave as a response signal Sa through the transmitting antenna. The frequency of the carrier wave of the response signal Sa ranges from 200 MHz to 500 MHz.

Figure 3:
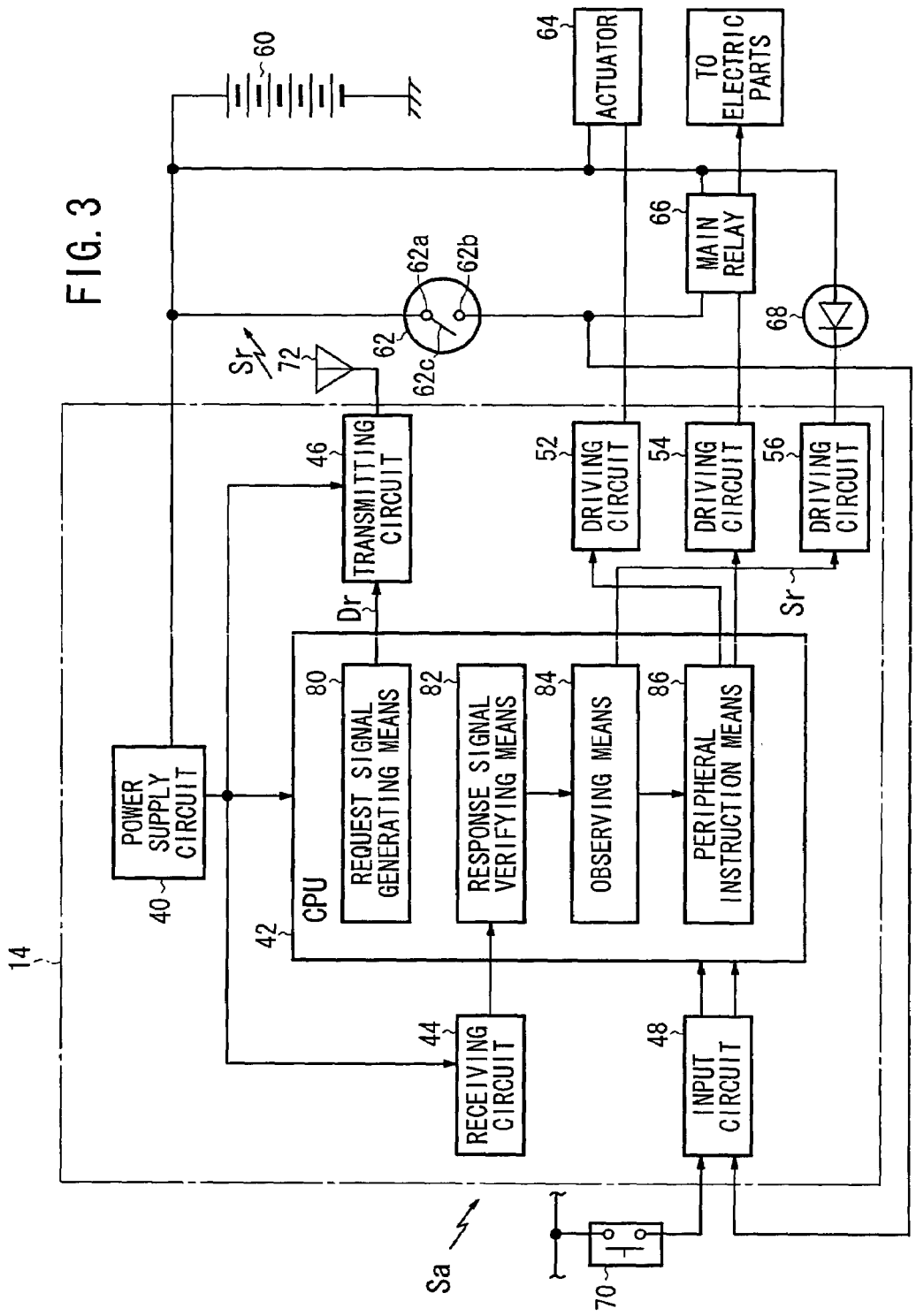
FIG. 3 is a block diagram showing a configuration of a control apparatus.

Meanwhile, the control apparatus 14 mounted on the actual vehicle 100 is formed from, for example, a system LSI. Further, for example, as shown in FIG. 3, the control apparatus 14 includes a power supply circuit 40, a CPU 42, a receiving circuit 44, a transmitting circuit 46, an input circuit 48, a first driving circuit 52 (for driving an actuator), a second driving circuit 54 (for driving a main relay) and a third driving circuit 56 (for driving an LED). At least a battery 60, a main switch 62, an actuator 64, a main relay 66, a warning lamp 68 (LED), a starting switch 70 and a transmitting antenna 72 are installed around the control apparatus 14.

The main switch 62 has two fixed contacts 62a and 62b and a movable contact 62c. The fixed contact 62a is connected to the battery 60, and the other fixed contact 62b is connected to the input circuit 48 and the main relay 66.

Not only the fixed contact 62b of the main switch 62 but also the starting switch 70 are connected to the input circuit 48. An ON/OFF state of the starting switch 70 and an ON/OFF state of the main switch 62 are supplied to the CPU 42 through the input circuit 48.

Incidentally, where the actual vehicle 100 is of the scooter type, for example, as shown in FIG. 4, the starting switch 70 may be provided on the seat 104 or in the proximity of the seat 104.

A space that can accommodate a helmet not shown is provided under the seat 104. Normally, when the user does not ride the vehicle, a helmet is accommodated in the space.

Further, at least a handle 106 (hereinafter referred to as seat handle 106 for the distinction from the handle bar 102 which is operated by a driver) used to open or close the seat 104 by manual operation is provided around a rear portion of the seat 104.

Accordingly, as a location for the starting switch 70, the seat handle 106, the inside of the seat 104 or the like is available. Where the starting switch 70 is provided on the seat handle 106, preferably the starting switch 70 is provided at a portion of the seat handle 106 which is to be gripped by the user when the user opens the seat 104. On the other hand, where the starting switch 70 is provided in the inside of the seat 104, preferably the starting switch 70 is buried at a location corresponding to a portion of the seat 104 with which the user touches when the user opens the seat 104.

Consequently, if the user performs an operation to open the seat 104 in order to take out the helmet, then the starting switch 70 is operated into an ON state at the same time. As a result, the operability regarding starting of the electronic key system 10 can be improved.

Figure 5:
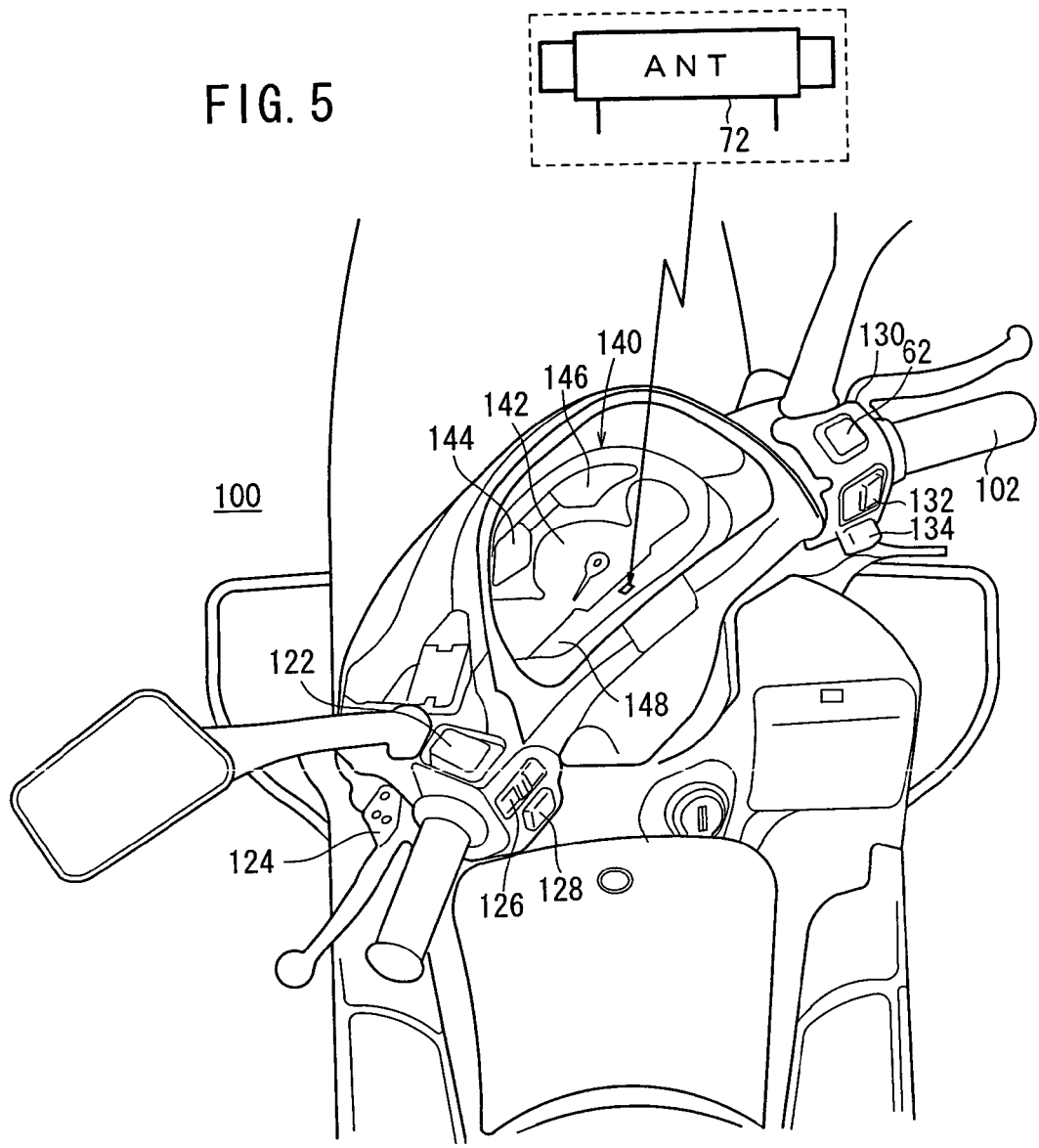
FIG. 5 is a schematic view showing an example of operation switches (switches which may be listed as a candidate of a starting switch) around a handle bar on an actual vehicle and an example of installation of a transmitting antenna on an instrument panel.

The starting switch 70 can be set to any one of, for example, an operation switch for starting an engine of the actual vehicle 100, an operation switch for security during driving and an operation switch used for stopping the engine of the actual vehicle 100. In particular, for example, as shown in FIG. 5, any one of a lighting dimmer switch 122, a rear brake switch 124, a winker switch 126, a horn switch 128, a front brake switch 130, a hazard switch 132 and a starter switch 134 which are installed around a handle bar 102 can be set as the starting switch 70.

For the setting of the starting switch 70, a method is available wherein, for example, when a user purchases the actual vehicle 100, the user decides the setting of the starting switch 70 upon contract with a dealer, and thereafter, wiring is performed in a factory based on the decision. For example, wiring for interconnection between a switch decided as the starting switch 70 and the input circuit 48 of the control apparatus 14 or a like operation is performed in a factory.

Meanwhile, the power supply circuit 40 of the control apparatus 14 supplies power from the battery 60 to the CPU 42, receiving circuit 44, transmitting circuit 46 and other components.

The receiving circuit 44 has a receiving antenna not shown. The receiving circuit 44 receives a response signal Sa and so forth transmitted thereto from the electronic key 12 through the receiving antenna, extracts the response signal Sa from the carrier wave and demodulates the response signal Sa. The demodulated signal is supplied to the CPU 42.

The CPU 42 executes at least four programs (a request signal generating means 80, a request signal verifying means 82, a observing means 84 and a peripheral instruction means 86).

The request signal generating means 80 reads out request data Dr (data on which a request signal Sr is to be based) from a ROM not shown in response to an ON operation of the starting switch 70 or the main switch 62 and outputs the request data Dr to the transmitting circuit 46. Further, after the engine is started, the request signal generating means 80 reads out the request data Dr from the ROM after every fixed interval of time and outputs the request data Dr to the transmitting circuit 46. The fixed interval of time is set to one of time periods of 10 to 100 sec taking the consumption of the battery 20 in the electronic key 12 into consideration.

The transmitting circuit 46 modulates the carrier wave based on the request data Dr supplied thereto from the CPU 42 and outputs a resulting signal as a request signal Sr through the transmitting antenna 72.

Figure 7:
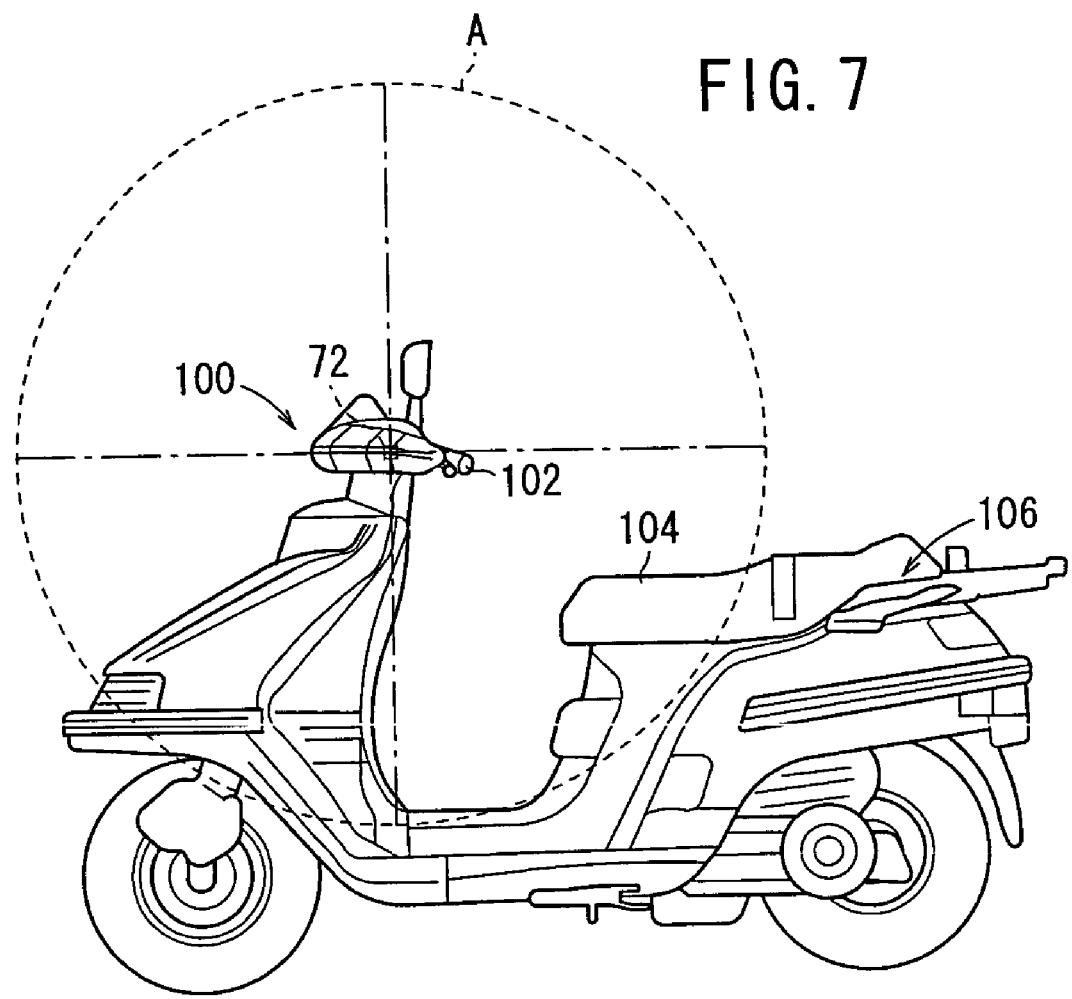
FIG. 7 is a side elevation view showing an example of a position at which a transmitting antenna is installed on an actual vehicle.
Figure 8:
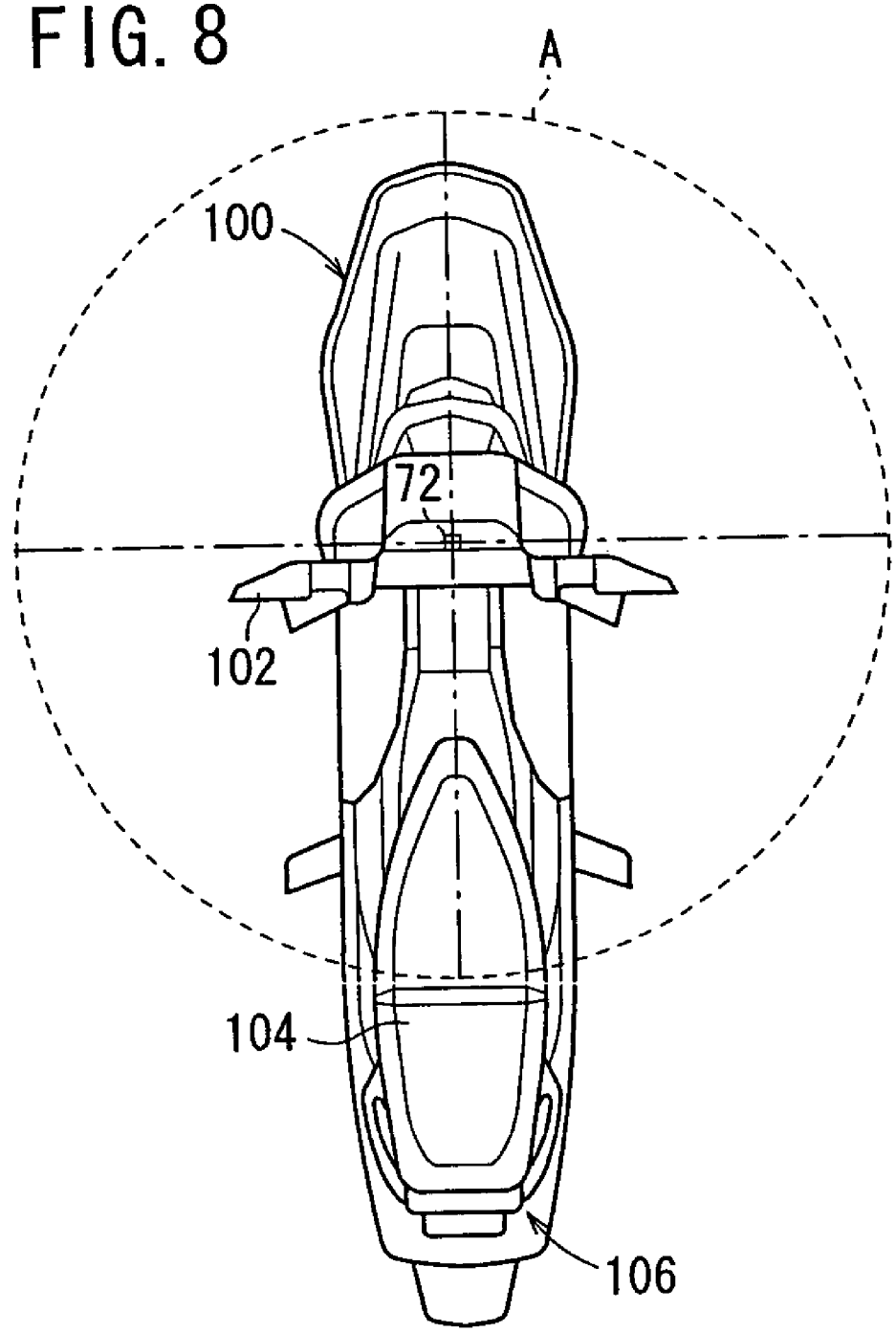
FIG. 8 is a top plan view showing the example of the position at which the transmitting antenna is installed on the actual vehicle.
Figure 9:
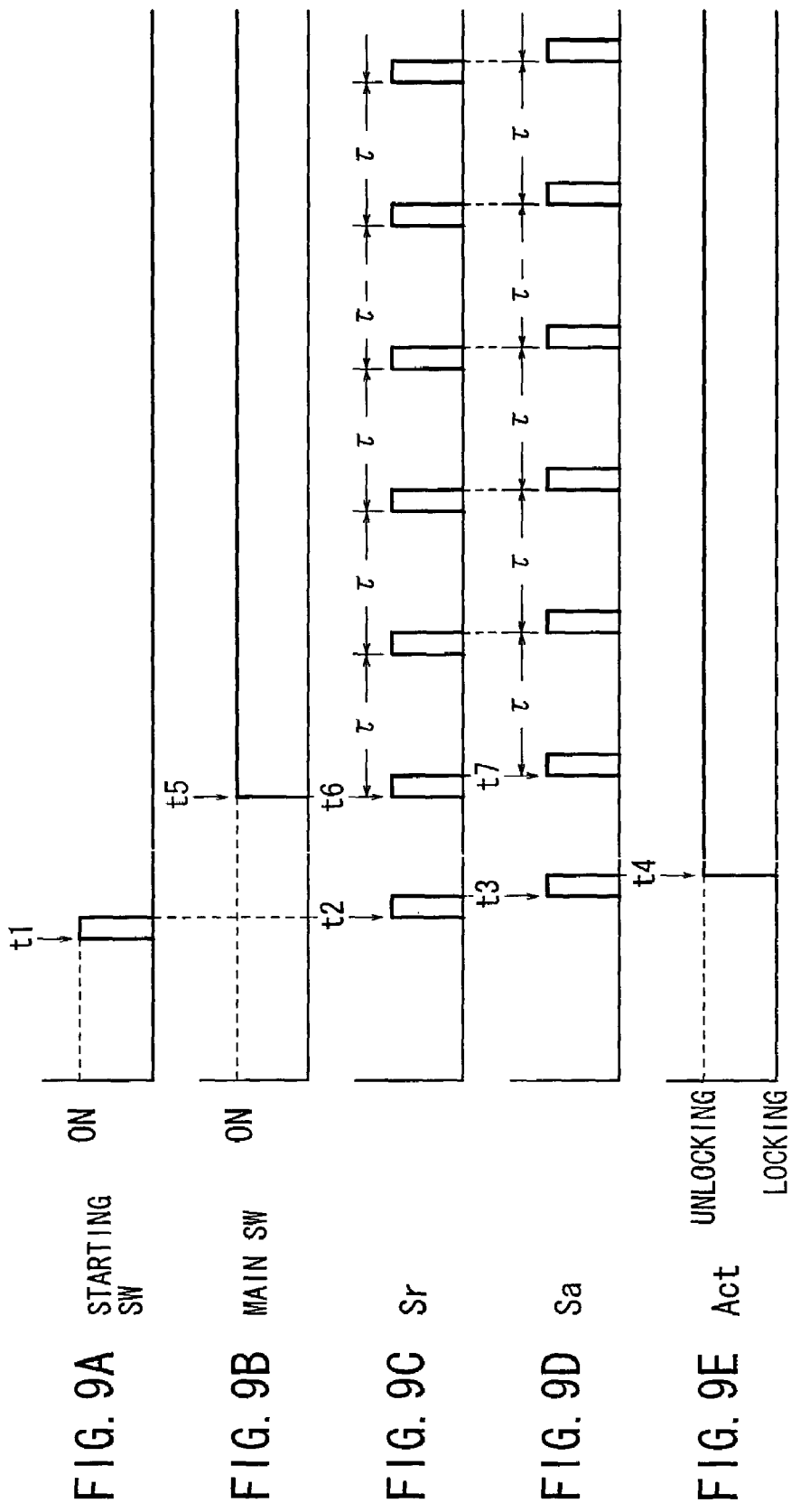
FIGS. 9A to 9E are timing charts illustrating processing operation of the electronic key system according to the present embodiment.

As shown in FIGS. 7 and 8, the transmitting range of the request signal Sr is a spherical range of a radius of 1 to 1.5 m around the transmitting antenna 72 mounted on the actual vehicle 100 (a range indicated by a circle A in FIGS. 7 and 8). The transmitting range of the request signal Sr is smaller than the transmitting range of the response signal Sa (range of a radius of several meters around the electronic key 12).

Figure 6:
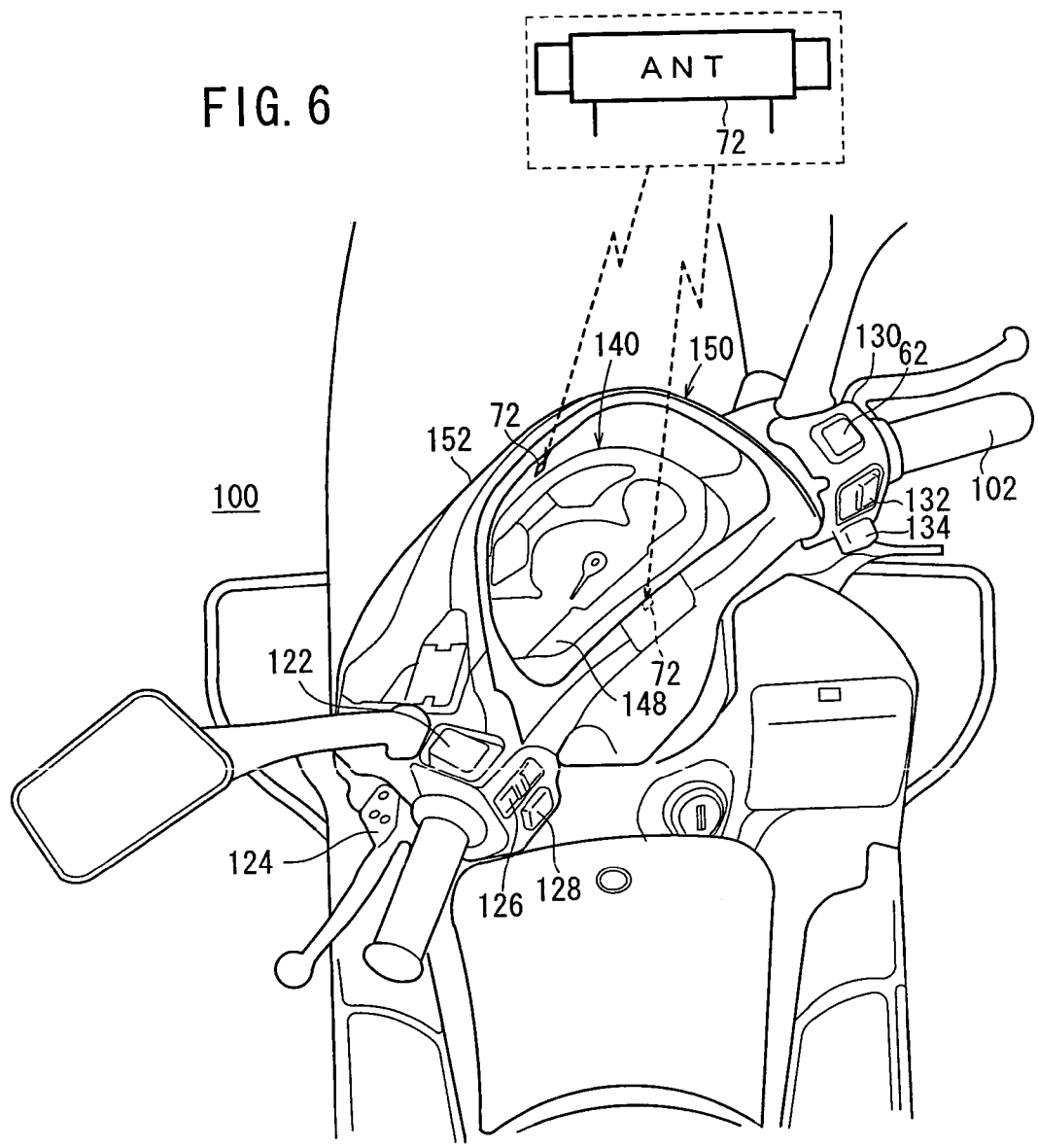
FIG. 6 is a schematic view showing an example of operation switches (switches which may be listed as a candidate of a starting switch) around a handle bar on an actual vehicle and an example of installation of a transmitting antenna on a shade.

Accordingly, in order to make it possible to perform communication of the control apparatus 14 with the electronic key 12 carried by the user with certainty at least when the user gets on and operates the actual vehicle 100 and when the user is running with the actual vehicle, preferably the transmitting antenna 72 is installed on the instrument panel 140 of the actual vehicle 100 as shown in FIG. 5, or the transmitting antenna 72 is installed on the instrument panel 140 of the actual vehicle 100 as shown in FIG. 6.

The instrument panel 140 includes various instruments (a speedometer 142, a direction indicator (left) 144, another direction indicator (right) 146, and so forth) and a board 148 for securing the instruments thereto. In the present embodiment, the board 148 is formed from a synthetic resin.

As the location in the proximity of the instrument panel 140, a location in the proximity of any of the various operation switches, a shade 150 mounted around the instrument panel 140 and so forth are listed. However, taking it into consideration that the transmitting antenna 72 should be positioned so as not to make an obstacle to any operation by the user, preferably it is installed on the shade 150.

The shade 150 has a framework 152 made of a synthetic resin and having an opening formed at a central portion thereof in such a manner as to surround the instrument panel 140.

In the example as shown in FIG. 5, the transmitting antenna 72 is installed at a position of the board 148 rather near to the seat 104 (a position of front side of the user when the user is seated on the seat 104).

In the example as shown in FIG. 6, the transmitting antenna 72 is installed on an inner wall surface of an upper portion of the framework 152 or an inner wall surface of a lower portion of the framework 152 (at a position rather near to the seat 104: a position of front side of the user when the user is seated on the seat 104).

The request signal verifying means 82 verifies whether or not a signal supplied thereto from the receiving circuit 44 is a response signal Sa. Further, when the signal mentioned is a response signal Sa, the request signal verifying means 82 verifies whether or not ID data included in the response signal Sa coincides with ID data registered in a memory not shown.

The observing means 84 observes based on an output of a request signal Sr whether or not a response signal Sa is terminated (whether or not coincidence of the ID is detected by the request signal verifying means 82). The observing means 84 enters a waiting state for an input of a response signal Sa at a point of time when the request signal generating means 80 outputs request data Dr. If a response signal Sa is not terminated within a predetermined period of time (when coincidence of the ID is not detected by the request signal verifying means 82), then the observing means 84 increments the count value by +1 to update it. Then, at a point of time when the count value becomes higher than a predetermined value, the observing means 84 outputs a warning signal Se to the third driving circuit 56.

Particularly if a response signal Sa is not terminated within the predetermined period of time after the point of time when the request data Dr is outputted in response to an ON operation of the starting switch 70 or the main switch 62, then at this stage, the observing means 84 outputs a warning signal Se to the third driving circuit 56.

The observing means 84 activates the peripheral instruction means 86 if a response signal Sa is terminated within the predetermined period of time after the point of time at which the request data Dr is outputted in response to an ON operation of the starting switch 70. The peripheral instruction means 86 outputs an unlocking signal to the first driving circuit 52 based on a request (for unlocking) from the observing means 84. Further, the peripheral instruction means 86 outputs an ON signal to the second driving circuit 54.

The first driving circuit 52 drives the actuator 64 in response to an input of the unlocking signal from the CPU 42 to release the locked state of the handle bar 102 and the seat 104.

The second driving circuit 54 is placed into an ON state in response to an input of the ON signal from the CPU 42. Thereafter, when the main relay 66 is placed into an ON state in response to an ON operation of the main switch 62, the second driving circuit 54 starts the engine to establish a state wherein the vehicle can run.

The third driving circuit 56 drives the warning lamp 68 in response to an input of the warning signal Se from the CPU 42 so that the warning lamp 68 emits light. For example, an LED can be used as the warning lamp 68.

It is to be noted that, if the main switch 62 is operated into an OFF state, then the main relay 66 is turned OFF and also the engine stops simultaneously. Then, if a locking operation is performed, for example, if an operation to place the seat 104 or the seat 104 into a locked state is performed, then the verifying operation of the response signal Sa by the control apparatus 14 is stopped. Further, the second driving circuit 54 is placed into an OFF state.

Now, processing operation of the electronic key system 10 according to the present embodiment is described with reference to timing charts of FIGS. 9A to 9E. It is to be noted that a request signal Sr is a signal having a pulse string based on request data Dr, and a response signal Sa is a signal having a pulse string based on data including ID data. It is to be noted, however, that, in order to simplify the description, each of the request signal Sr and the response signal Sa is represented as a signal of one pulse in FIGS. 9A to 9E.

First, in a normal state, if the starting switch 70 is operated to an ON state at time t1 of FIG. 9A while the user holds the electronic key 12, then a request signal Sr is transmitted from the control apparatus 14 as seen in FIG. 9C (refer to time t2) and communication of the control apparatus 14 with the electronic key 12 is started.

Where the user holds the electronic key 12, the request signal Sr is received through the receiving circuit 26 (refer to FIG. 2) of the electronic key 12. The electronic key 12 transmits a response signal Sa as seen in FIG. 9D in response to the receiving of the request signal Sr (refer to time t3). The response signal Sa is supplied through the receiving circuit 44 (refer to FIG. 3) of the control apparatus 14 to the CPU 42, by which ID data included in the response signal Sa is verified. If it is discriminated that the ID data exhibits coincidence, then the locked state of the handle bar 102 and the seat 104 is released (unlocked) as seen in FIG. 9E through the control apparatus 14 and the first driving circuit 52 (refer to time t4). As a result of the unlocking, steering by the handle bar 102 is enabled, and the seat 104 is slightly raised. Consequently, the user can recognize simply that the locked state of the handle bar 102 and the seat 104 has been released. Further, thereupon, the second driving circuit 54 is placed into an ON state.

Thereafter, if the user operates the main switch 62 into an ON state at time t5 of FIG. 9B while it holds the electronic key 12, then a request signal Sr is transmitted from the control apparatus 14 as seen in FIG. 9C (refer to time t6), and communication of the control apparatus 14 with the electronic key 12 is performed.

Where the user holds the electronic key 12, the electronic key 12 transmits a response signal Sa as seen in FIG. 9D (refer to time t7) in response to the receiving of the request signal Sr in a similar manner as described hereinabove. The response signal Sa is supplied through the receiving circuit 44 of the control apparatus 14 to the CPU 42, by which ID data included in the response signal Sa is verified. If it is discriminated that the ID data exhibits coincidence, then the processing advances to a next step, that is, to a step at which the request signal Sr is outputted after every interval τ of time.

After this state, for example, the user is running with the actual vehicle 100, and during the running, the request signal Sr is outputted from the control apparatus 14 after every interval τ of time. In other words, communication of the control apparatus 14 with the electronic key 12 is performed after every interval τ of time, and the electronic key 12 outputs a response signal Sa after every substantially fixed interval τ of time.

The processing operation described above is a process after the user holding the electronic key 12 gets on and operates the actual vehicle 100 until it runs with the actual vehicle 100. Now, a processing operation when it is detected that the electronic key 12 is absent upon starting of the actual vehicle 100 is described simply.

First, if the user operates the starting switch 70 into an ON state while it does not hold the electronic key 12, then a request signal Sr is transmitted from the control apparatus 14. However, the control apparatus 14 does not perform perception of a response signal Sa to the request signal Sr outputted therefrom. As a result, the observing means 84 outputs a warning signal Se to the third driving circuit 56. Consequently, the warning lamp 68 is lit. Naturally, in this instance, such a process as unlocking of the handle bar 102 and the seat 104 or the like is not performed.

From the lighting of the warning lamp 68, the user can recognize that it does not hold the electronic key 12. Consequently, starting of the engine while the electronic key 12 is not held can be prevented.

Subsequently, a processing operation when it is determined that the electronic key 12 is not present upon starting of the engine of the actual vehicle 100 is described simply.

First, if the user operates the starting switch 70 into an ON state while it holds the electronic key 12, then a request signal Sr is transmitted from the control apparatus 14, and communication of the control apparatus 14 with the electronic key 12 is started. Through the communication, ID data included in a response signal is verified, and if it is discriminated that the ID data does not exhibit coincidence, then the locked state of the handle bar 102 and the seat 104 is released.

Then, if the main switch 62 operates the main switch 62 into an ON state without recognizing that, for example, the electronic key 12 has dropped, then although a request signal Sr is transmitted from the control apparatus 14, the control apparatus 14 does not perform receiving of a response signal Sa to the thus outputted request signal Sr any more. As a result, the observing means 84 outputs a warning signal Se to the third driving circuit 56, and consequently, the warning lamp 68 is lit.

From the lighting of the warning lamp 68, the user will recognize that the electronic key 12 has dropped. Consequently, otherwise possible loss of the electronic key 12 can be prevented.

Particularly since the transmitting antenna 72 is installed on the instrument panel 140 or the shade 150 positioned at an upper portion of the actual vehicle 100, the transmitting range of the transmitting antenna 72 becomes a range around the upper portion of the actual vehicle 100 as seen in FIG. 6. Accordingly, substantially at the same time when the electronic key 12 drops in error when it gets on and operates the actual vehicle 100, the electronic key 12 goes out of the transmitting range of the transmitting antenna 72. In other words, substantially at the same time when the electronic key 12 drops, the warning lamp 68 emits light, and the user immediately will recognize that the electronic key 12 has dropped.

Now, a processing operation when it is determined that the electronic key 12 is not present while the actual vehicle 100 is running is described briefly.

First, processes after an ON operation of the starting switch 70 till an ON operation of the main switch 62 are same as those at times t1 to t7 in FIGS. 9A to 9E.

When the engine starts in response to the ON-operation of the main switch 62, the processing advances to a step at which a request signal Sr is outputted after every interval τ of time as described hereinabove. After this stage, the user is, for example, running with the actual vehicle 100, and during the running, a request signal Sr is outputted from the control apparatus 14 after every interval τ of time.

If, for example, the electronic key 12 drops during running with the actual vehicle 100, then receiving of a response signal Sa by the control apparatus 14 is not performed any more. When a response signal Sa is not received within a predetermined interval of time after the point of time at which the request data Dr is outputted, the observing means 84 increments the count value by +1 to update it. At a point of time when the count value exceeds a predetermined value while a request signal Sr is successively outputted, the observing means 84 outputs a warning signal Se to the third driving circuit 56. Consequently, the warning lamp 68 is lit.

From the lighting of the warning lamp 68, the user will recognize that the electronic key 12 has dropped, and otherwise possible loss of the electronic key 12 can be prevented.

Incidentally, the user often performs, as an operation when the user gets on the actual vehicle 100, an operation at a position in the proximity of the instrument panel 140 such as an operation of a switch disposed around the handle bar 102 or confirmation of the instruments.

In the example of FIG. 5 in the electronic key system 10 according to the present embodiment, the transmitting antenna 72 of the control apparatus 14 (which transmits a request signal Sr) is installed on the instrument panel 140 of the actual vehicle 100. Therefore, the request signal Sr transmitted from the control apparatus 14 is outputted from the instrument panel 140 of the actual vehicle 100. Meanwhile, in the example of FIG. 6, the transmitting antenna 72 is installed in the proximity of the instrument panel 140 of the actual vehicle 100. Particularly, the transmitting antenna 72 is installed on the shade 150 mounted around the instrument panel 140. Therefore, the request signal Sr transmitted from the control apparatus 14 is outputted from the location in the proximity of the instrument panel 140 of the actual vehicle 100.

Therefore, as the transmitting range, a range within which the user is present when the user performs an operation that may be normally performed when the user gets on the vehicle can be almost covered. As a result, at least when the user gets on and operates the actual vehicle 100 and when the user is running with the actual vehicle, communication of the control apparatus 14 with the electronic key 12 carried by the user can be performed with certainty.

The wiring line between the control apparatus 14 and the transmitting antenna 72 and the wiring lines for the various instruments can be bundled together. Therefore, reduction of the space for the wiring line paths and reduction of a harness (connector) circuit can be anticipated. Consequently, such merits as miniaturization, reduction of the weight, reduction of the cost of the electronic key system 10 and hence of electric parts and so forth can be achieved.

In the example of FIG. 5, since the transmitting antenna 72 is installed on the board 148 of the instrument panel 140, there are merits that, when the user observes the instruments, the transmitting antenna 72 does not make an obstacle and besides that the transmitting antenna 72 can be mounted readily. Since the board 148 is made of a synthetic resin, the transmitting antenna 72 can be mounted readily in a gap between the instruments on the board 148.

Furthermore, in the example of FIG. 5, the transmitting antenna 72 is installed at a position of the board 148 rather near to the seat 104. Consequently, when the user performs an operation when it gets on the vehicle, the transmitting antenna 72 exists at a position nearest to the position at which the user exists. Consequently, communication of the control apparatus 14 with the electronic key 12 carried by the user can be performed with a higher degree of certainty.

Meanwhile, in the example of FIG. 6, the transmitting antenna 72 is installed on the shade 150. Since the shade 150 is made of a synthetic resin, the transmitting antenna 72 can be mounted simply at any portion of the shade 150. Particularly, in the example of FIG. 6, the transmitting antenna 72 is installed on an inner wall surface of the shade. Therefore, when the user observes the instruments, the transmitting antenna 72 does not make an obstacle at all, and besides there is a merit that the transmitting antenna 72 can be mounted readily.

It is to be noted that, where the transmitting antenna 72 is installed on an inner wall surface of a lower portion of the framework 152, when the user performs an operation when it gets on the vehicle, the transmitting antenna 72 exists at a position nearest to the position at which the user exists. Consequently, communication of the control apparatus 14 with the electronic key 12 carried by the user can be performed with a higher degree of certainty.

Subsequently, two modifications to the electronic key system 10 according to the present embodiment are described with reference to FIGS. 10 to 15.

Figure 10:
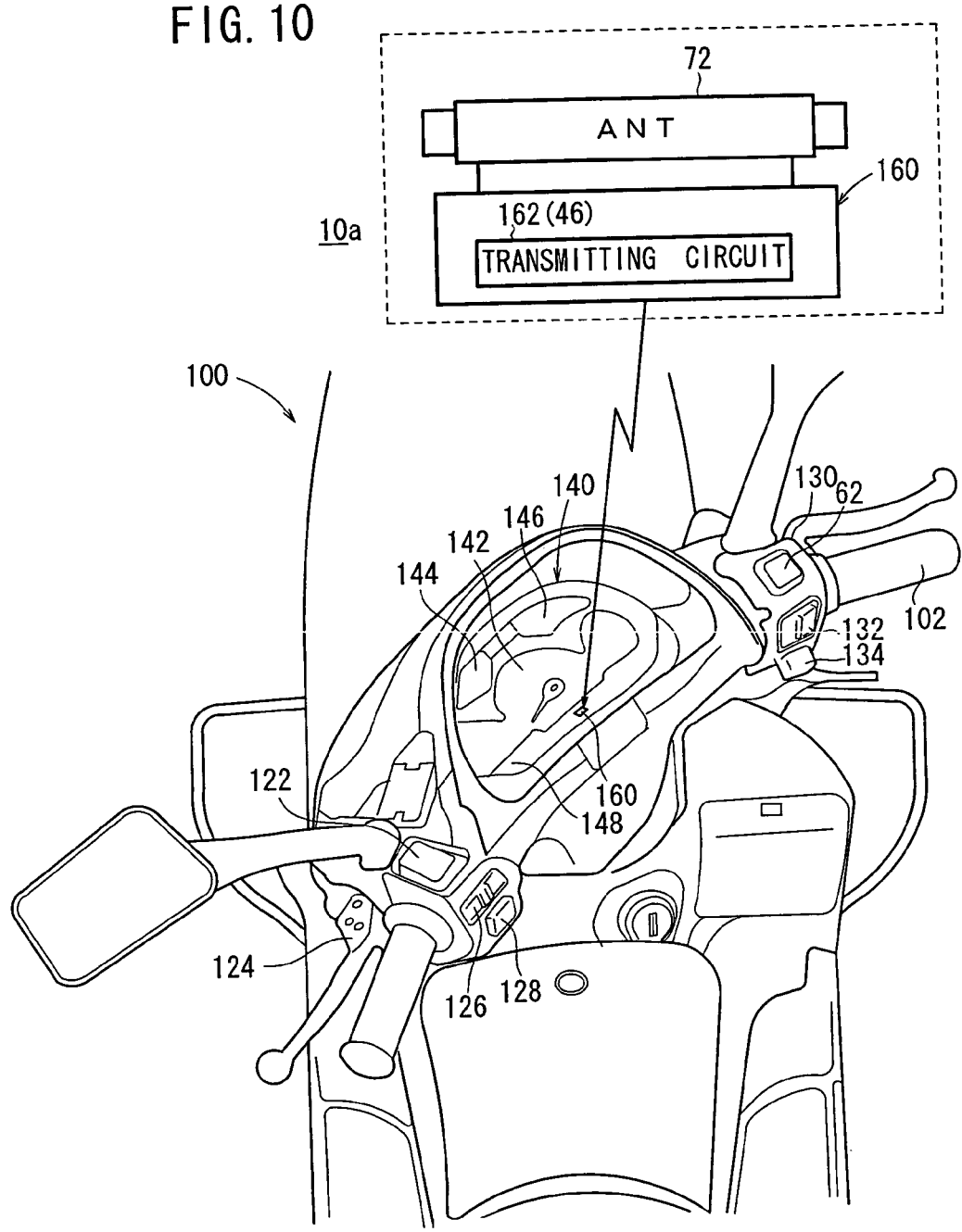
FIG. 10 is a schematic view showing one example wherein a transmitting unit of an electronic key system according to a first modification is mounted on an actual vehicle.
Figure 11:
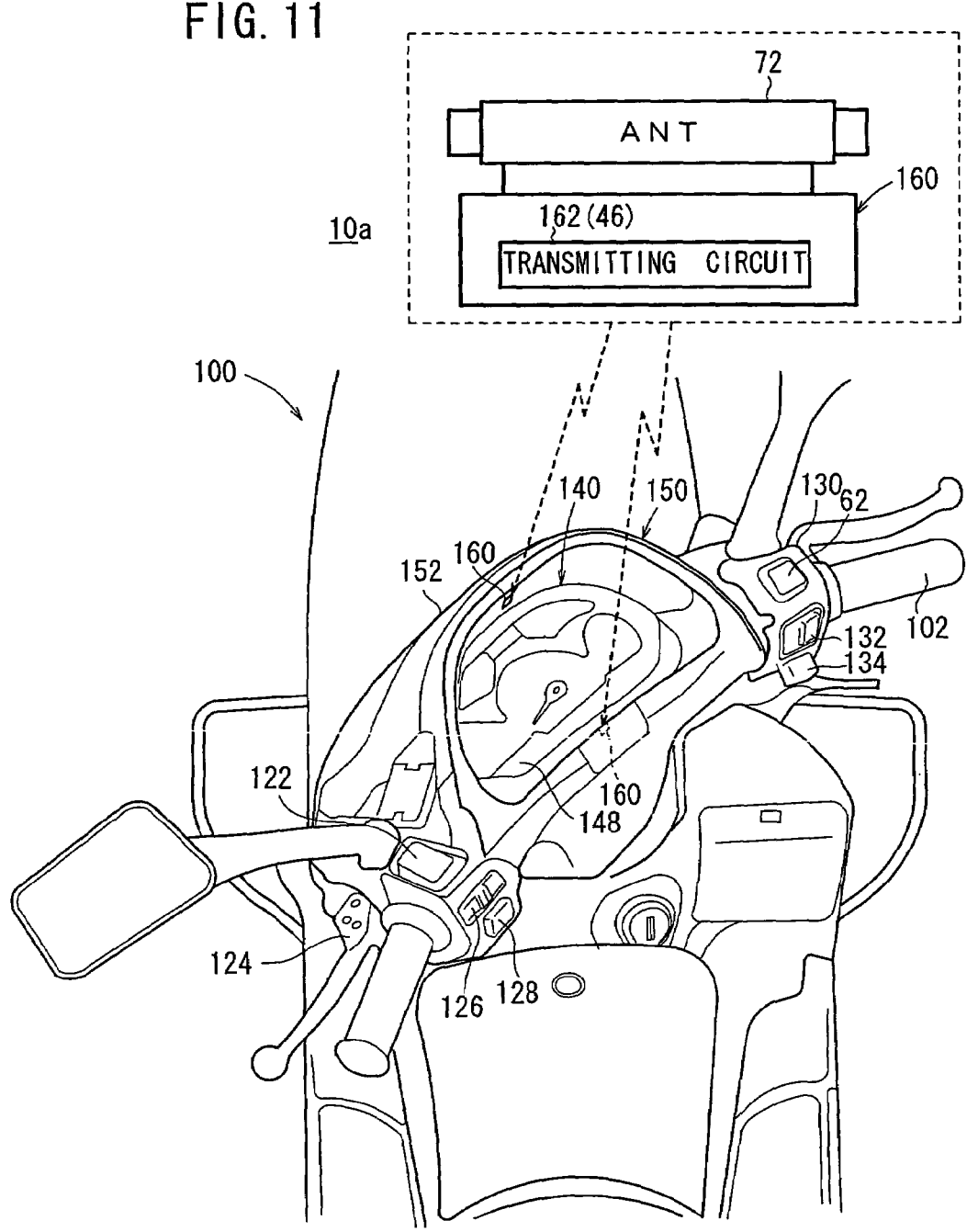
FIG. 11 is a schematic view showing another example wherein a transmitting unit of an electronic key system according to a first modification is mounted on an actual vehicle.

First, the electronic key system 10a according to the first modification has a configuration substantially similar to that of the electronic key system 10 according to the first embodiment described above. However, the electronic key system 10a is different from the electronic key system 10 in that a transmitting unit 160 is installed on the instrument panel 140 of the actual vehicle 100 as shown in FIG. 10. Or the electronic key system 10a is different from the electronic key system 10 in that a transmitting unit 160 is installed in the proximity of the instrument panel 140 of the actual vehicle 100 (on an inner wall surface of an upper portion or on an inner wall surface of a lower portion of the framework 152) as shown in FIG. 11.

Figure 12:
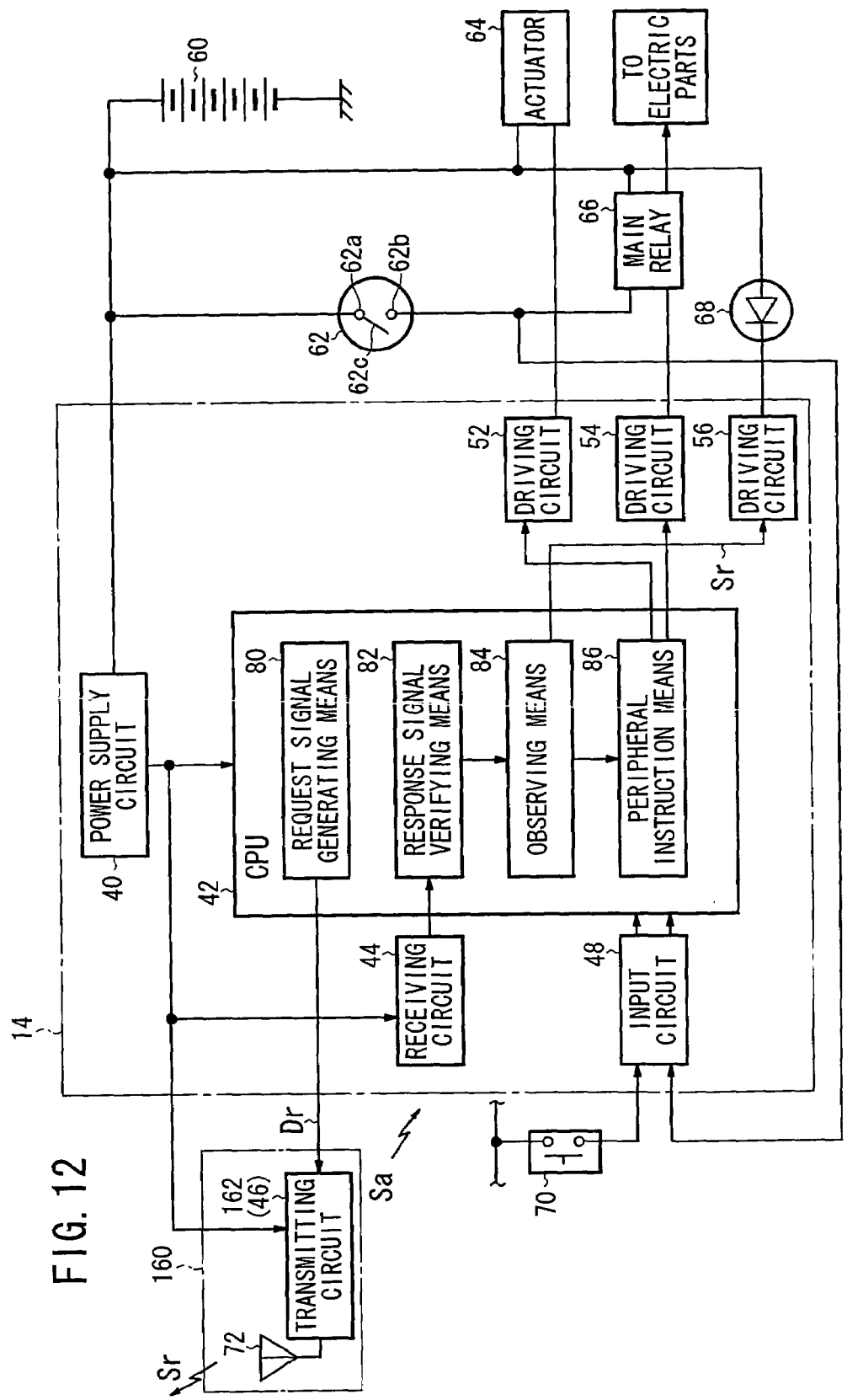
FIG. 12 is a block diagram showing a configuration of a control apparatus and the transmitting unit in the electronic key system according to the first modification.

In the transmitting unit 160, the transmitting circuit 46 is separated from the control apparatus 14 formed from a system LSI so as to form a single electronic part 162 as shown in FIG. 12. The electronic part 162 is electrically connected to the transmitting antenna 72 so as to generally form a unit.

Figure 13:
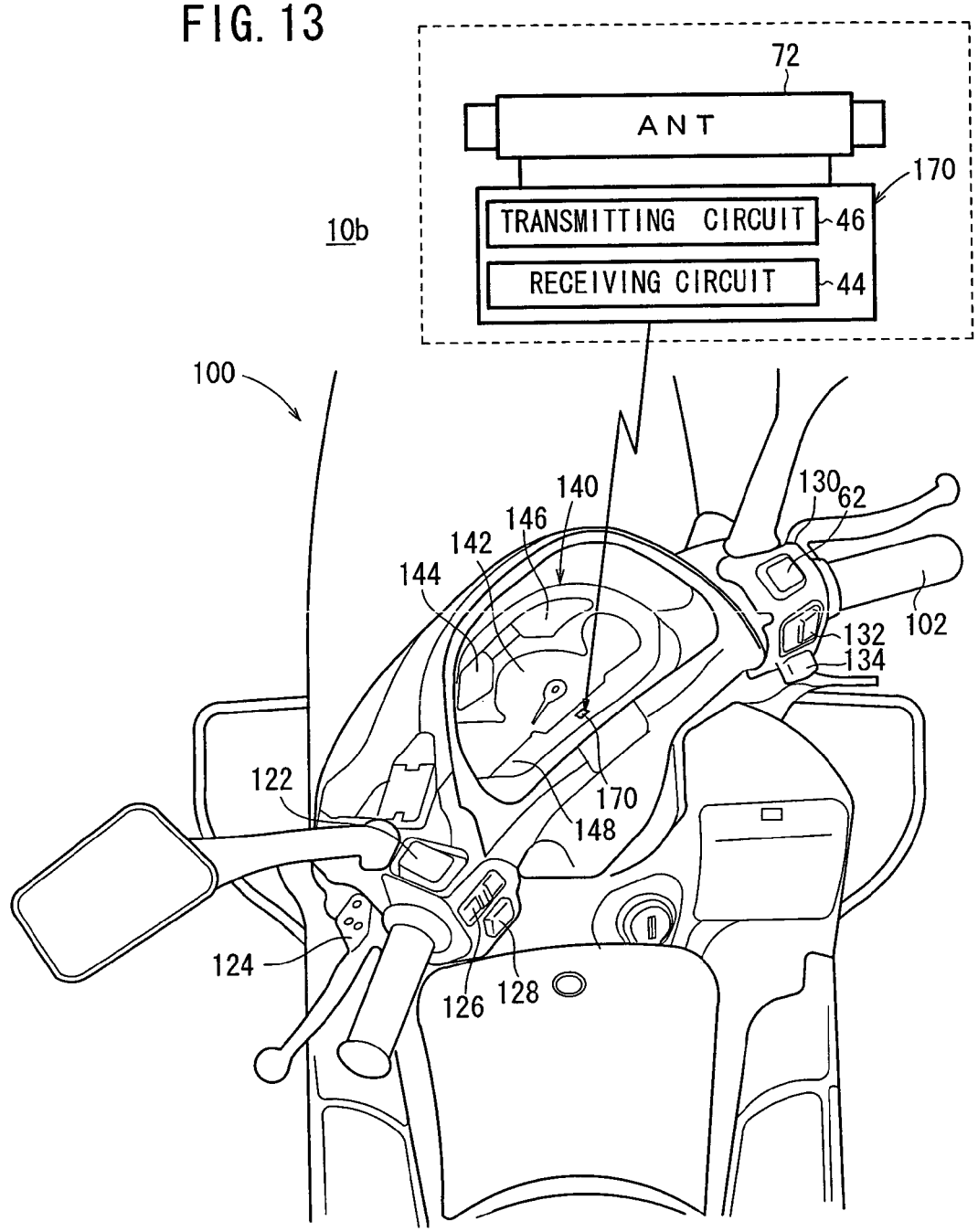
FIG. 13 is a schematic view showing one example wherein a transmitting/receiving unit of an electronic key system according to a second modification is mounted on an actual vehicle.
Figure 14:
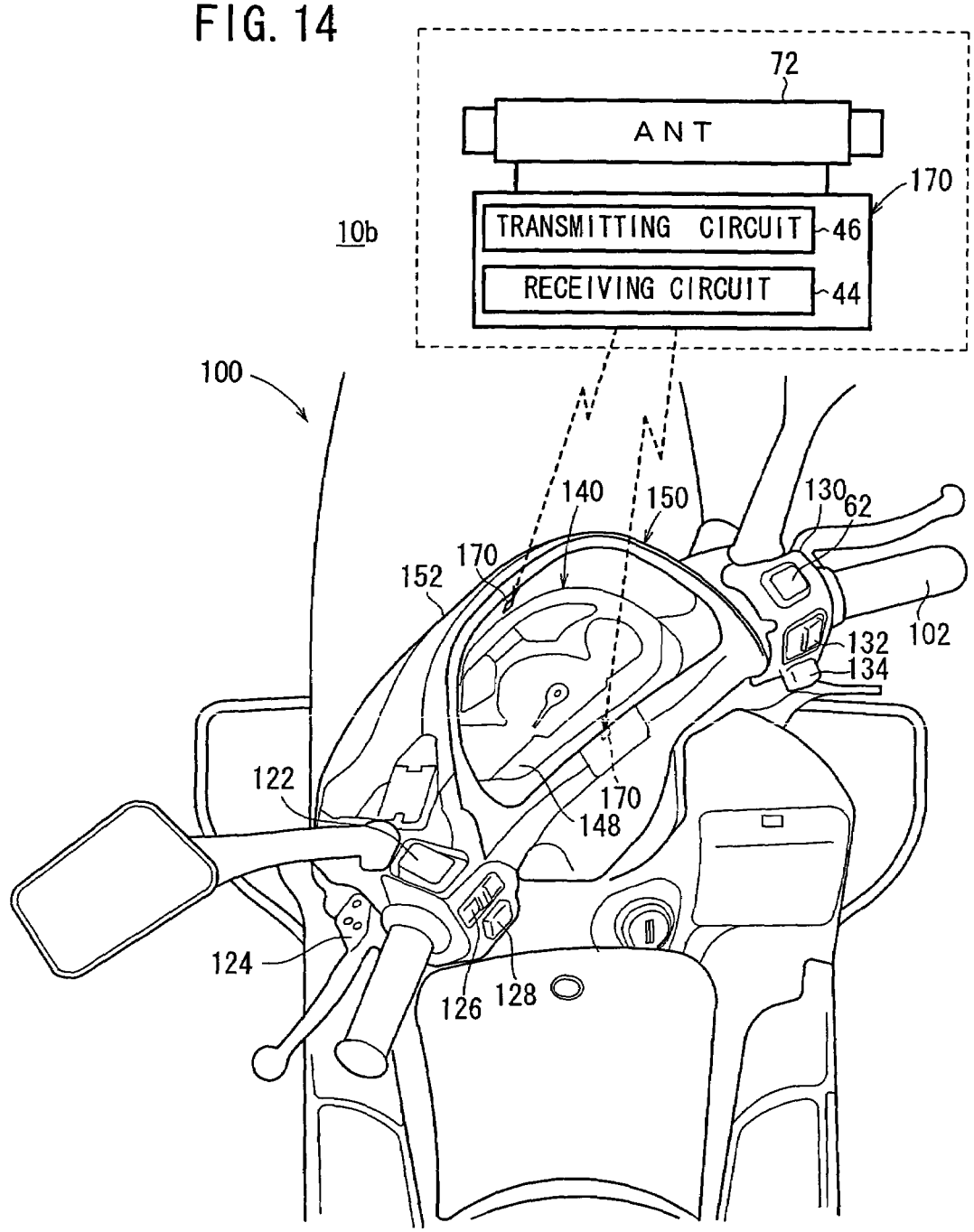
FIG. 14 is a schematic view showing another example wherein a transmitting/receiving unit of an electronic key system according to a second modification is mounted on an actual vehicle.

The electronic key system 10b according to the second embodiment has a configuration substantially similar to that of the electronic key system 10 according to the present embodiment described above. However, the electronic key system 10b is different from the electronic key system 10 in that a transmitting/receiving unit 170 is installed on the instrument panel 140 of the actual vehicle 100 as shown in FIG. 13, or the electronic key system 10b is different from the electronic key system 10 in that a transmitting/receiving unit 170 is installed in the proximity of the instrument panel 140 of the actual vehicle 100 (on an inner wall surface of an upper portion or on an inner wall surface of a lower portion of the framework 152) as shown in FIG. 14.

In the transmitting/receiving unit 170, the receiving circuit 44 and the transmitting circuit 46 are separated from the control apparatus 14 formed from a system LSI to form a single electronic part. Thus, the electronic part 172 includes the receiving circuit 44 and the transmitting circuit 46 integrated therein as seen in FIG. 15. The transmitting circuit 46 of the electronic part 172 and the transmitting antenna 72 are electrically connected to each other so as to generally form a unit.

Which one of the electronic key system 10 according to the present embodiment and the electronic key systems 10a and 10b according to the first and second modifications described above should be selectively determined taking the size of the actual vehicle 100, the paths of the wiring lines, the installation space for the transmitting antenna 72 and so forth into consideration.

It is to be noted that the electronic key system for a vehicle according to the present invention is not limited to the embodiment described above but can adopt various configurations without departing from the subject matter of the present invention.

What is claimed is:

1. An electronic key system for a motorcycle, comprising:
   a control apparatus mounted on the motorcycle,
   an electronic key for transmitting a response signal in response to receiving a request signal transmitted from said control apparatus through a transmitting antenna,
   an instrument panel disposed around a handle bar near the center of rotation of said handle bar, and
   a warning lamp installed around said control apparatus for indicating a receiving state of said response signal,
   wherein said instrument panel turns as said handle bar turns,
   wherein said transmitting antenna is installed on said instrument panel of said motorcycle or a framework surrounding said instrument panel of said motorcycle,
   wherein said transmitting antenna is installed near the center of rotation of said handle bar,
   wherein said transmitting antenna has a first range of transmission, said electronic key has a second range of transmission, and said first range of transmission is smaller than said second range of transmission,
   wherein when an engine of said motorcycle starts, said request signal is output in response to a starting operation of said engine, a presence of said response signal is observed based on said output of said request signal, said warning lamp is immediately driven if said response signal is not detected within a first predetermined period of time, and
   wherein during driving after said engine starts, said request signal is output every fixed interval of time, a presence of said response signal is observed based on said output of said request signal, and a count value is updated if said response signal is not detected within a second predetermined period of time, and said warning lamp is driven when said count value becomes higher than a predetermined value.

2. An electronic key system for a motorcycle according to claim 1,
   wherein said instrument panel has one or more instruments and a board for securing said instruments thereto, and
   wherein said transmitting antenna is provided on said board.

3. An electronic key system for a motorcycle according to claim 2,
   wherein said transmitting antenna is installed at a position on said board rather near to a seat.

4. An electronic key system for a motorcycle according to claim 1, further comprising a shade mounted around said instrument panel, and wherein said transmitting antenna is installed on said shade.

5. An electronic key system for a motorcycle according to claim 4,
   wherein said shade is made of a resin.

6. An electronic key system for a motorcycle according to claim 4,
   wherein said transmitting antenna is installed on an inner wall surface of said shade.

7. An electronic key system for a motorcycle according to claim 1, wherein:
   said request signal is output every fixed interval of time in response to a starting operation of said motorcycle,
   a presence of said response signal is observed based on said output of said request signal,
   said count value is updated if said response signal is not detected within said second predetermined period of time, and
   said warning lamp is driven when said count value becomes higher than said predetermined value.

* * * * *